United States Patent
Kim et al.

(10) Patent No.: US 7,859,432 B2
(45) Date of Patent: Dec. 28, 2010

(54) COLLISION AVOIDANCE SYSTEM BASED ON DETECTION OF OBSTACLES IN BLIND SPOTS OF VEHICLE

(75) Inventors: Heung Seop Kim, Gimhae-si (KR); Won Moo Hur, Gimhae-si (KR); Hwa Sik Kim, Busan (KR); Jong Sup Park, Busan (KR); Young Hoon Kim, Busan (KR)

(73) Assignees: Che Il Electric Wireing Devices Co., Ltd. (KR); Che Il Electronics Ind. Co., Ltd. (KR)

( * ) Notice: Subject to any disclaimer, the term of this patent is extended or adjusted under 35 U.S.C. 154(b) by 292 days.

(21) Appl. No.: 12/053,464

(22) Filed: Mar. 21, 2008

(65) Prior Publication Data

US 2008/0291000 A1     Nov. 27, 2008

(30) Foreign Application Priority Data

May 23, 2007    (KR)  ..................... 10-2007-0050298
Dec. 18, 2007    (KR)  ..................... 10-2007-0133232

(51) Int. Cl.
     *G08G 1/017*      (2006.01)
(52) U.S. Cl. ................ 340/937; 340/435; 340/903; 340/942; 348/148
(58) Field of Classification Search ......... 340/435–436, 340/903, 937, 942; 348/148
See application file for complete search history.

(56) References Cited

U.S. PATENT DOCUMENTS 7,061,373 B2 *   6/2006   Takahashi ................... 340/435
7,477,137 B2 *   1/2009   Matsumoto et al. ......... 340/436
2002/0005778 A1 *   1/2002   Breed et al. ................. 340/435
2006/0006988 A1 *   1/2006   Harter et al. ................ 340/435
2006/0182312 A1 *   8/2006   Nakai et al. ................. 382/103

* cited by examiner

*Primary Examiner*—Brent Swarthout
(74) *Attorney, Agent, or Firm*—Park & Associates IP Law LLC

(57) ABSTRACT

The present invention relates to a collision avoidance system based on the detection of obstacles (e.g., other vehicles and obstructive objects) in the blind spots of a vehicle. The collision avoidance system includes: a turn signal lamp detector for detecting an activation of a turn signal lamp of the vehicle; a charge-coupled device (CCD) camera for capturing an image for a road environment, outputting the captured image as road environment data, and measuring a winding or curvature degree of a current road; a steering angle detector for detecting a steering angle of the vehicle and outputting a resulting signal as a steering angle signal; an infrared sensor for transmitting or receiving infrared light to or from an obstacle present in a blind spot of the vehicle, and outputting an obstacle detection signal; a warning device configured to warn the possibility of collision between the obstacle and the vehicle to a driver; and a controller configured to operate the warning device upon detection of the activation of the turn signal lamp by the turn signal lamp detector, followed by activation of the infrared sensor to determine presence of an obstacle in the blind spot, the controller further configured to operate the warning device upon detection of a progress of lane change based on comparison between the road environment data and the steering angle signal output, followed by activation of the infrared sensor to determine presence of an obstacle in the blind spot.

11 Claims, 9 Drawing Sheets

COLLISION AVOIDANCE SYSTEM BASED ON DETECTION OF OBSTACLES IN BLIND SPOTS OF VEHICLE

FIELD OF THE INVENTION

The present invention relates, in general, to a collision avoidance system based on the detection of obstacles in the blind spots of a vehicle, and, more particularly, to a collision avoidance system based on the detection of obstacles in the blind spots of a vehicle, which detects an obstacle in a blind spot even when a vehicle changes lanes without turning on a turn signal lamp, and informs a driver of the detected obstacle in the blind spot, thus preventing collision accidents from occurring during traveling.

BACKGROUND OF THE INVENTION

The growth of the automobile industry is indicated by the development of an excellent engine, which can be called the heart of a vehicle, as the clearest evidence. Of course, various factors, such as an increase in fuel consumption ratio, and the prevention of environmental pollution, are taken into account, but the most important factor is a method of allowing a vehicle equipped with an excellent engine to travel at high speed for a long period of time in various environments. The vehicle travel speed increases with the development of the engine, and, consequently, consumers require that safe vehicles be provided.

A large number of vehicle safety systems are developed due to structural factors, such as the requirement to provide airbags, the requirement to wear safety belts, and increased roof strength, and the utilization of auxiliary devices for protecting human life when a collision occurs. In addition to a safety device directly related to a collision, various safety devices, such as a rotating headlight, a reflective mirror for preventing glare from occurring during night driving, and a night fluoroscope using an infrared camera, are introduced.

One factor to which drivers must always pay attention while driving is to check a blind spot. Generally, approaching vehicles are monitored using mirrors, but it is impossible to monitor approaching vehicles present in a blind spot using the mirror when a driver changes lanes or turns a vehicle. In order to prevent accidents from occurring due to the impossibility of checking a blind spot, an auxiliary mirror may be installed, or alternatively, a driver turns his or her head to check, but the driver's gaze is diverted away from the traveling direction, and thus it is difficult to absolutely guarantee the driver's safety. Even a skillful driver may occasionally and instantaneously feel at risk because he or she cannot sense a vehicle in a blind spot when driving in conditions in which the driver's field of vision is poor, such as night driving or driving in environmental conditions such as mist, rain or snow. In particular, recently produced vehicles are equipped with excellent soundproof facilities, and thus there are many cases where approaching vehicles cannot be sensed merely from the noise level sensed inside the vehicles.

According to traffic accident statistics from the road traffic safety authority, about 5.7% of all multiple-vehicle traffic accidents are caused by passing or lane changes. The statistical data shows that, among all accidents, front collision accidents have the highest lethality (10.7 persons/100 cases), and accidents attributable to the impossibility of detecting risks present in rear left/right blind spots have the next highest lethality (6.8 persons/100 cases). Meanwhile, conventional side rear view mirrors have been used as one of the most basic parts of vehicles in the past 70 years from the standpoint of the security of side rear views of vehicles.

FIG. 1 is a diagram showing a region that can be checked by a driver using a conventional side rear view mirror and a blind spot region occurring due to the visual restrictions imposed on a side rear view mirror or a driver.

Referring to FIG. 1, the conventional side rear view mirror has a blind spot (A) having a certain area due to the restriction of the size and angle of the mirror. Generally, the blind spot (A) begins at an angle of 15° with respect to the side of a vehicle body and ends at an angle of 45°. The term "blind spot (A)" means regions that cannot be seen by side rear view mirrors or a rear view mirror fixedly installed to the vehicle, and that correspond to the lower regions of areas in front of and behind the vehicle and regions adjacent to both sides of the vehicle. As the size of a vehicle body increases, the area of the blind spot is increased. Accordingly, as the number of luxury vehicles increases, the number of traffic accidents gradually increases due to the incomplete fields of vision. In order to solve this problem, vehicle blind spot detection technology for preventing accidents by securing as wide a field of vision as possible for a driver has recently been successively developed.

For example, there are technologies, such as technology using mirrors of combining auxiliary mirrors, such as convex mirrors, with the side rear view mirrors of a vehicle and installing the auxiliary mirrors at required locations, screen display (Closed Circuit Television: CCTV)-related technology for reducing the blind spot of a rear view, occurring due to a lane change, by adjusting the angle of a camera and the screen division of a monitor so that the region of a vehicle access road can be seen in detail according to the operation of a turn signal lamp or the like, and technology for generating a warning sound or displaying a warning icon using ultrasonic or laser distance sensors when a person or an obstacle approaches.

Further, since the incidence of traffic accidents attributable to a blind spot during a lane change is high, vehicle manufacturers are taking a great interest in a Blind Spot Detection system (BSD) for preventing traffic accidents. A technique for determining the presence of an obstacle using triangulation, which uses a single emitter and two detectors, that is, a positive detector (PD+) and a negative detector (PD−), was proposed in U.S. Pat. No. 5,418,359, filed in November 1993. U.S. Pat. No. 5,675,326, filed in July 1995, and U.S. Pat. No. 5,463,384, filed in May 1994 (by Auto-Sense Ltd.), disclose a method of configuring an infrared blind slot detector array composed of a plurality of detectors, a method of optically designing respective emitters and detectors, an experimental method of performing vehicle detection using the methods, and the results thereof.

FIG. 2 is a diagram showing the construction of a conventional blind spot detection system, and FIG. 3 is a flowchart showing a process for detecting an obstacle in a blind spot using the conventional blind spot detection system.

As shown in FIGS. 2 and 3, the conventional blind spot detection system includes a turn signal lamp detection means 1 for detecting the operation of a turn signal lamp, an infrared sensor means 2 for detecting an obstacle present in the blind spot of a vehicle, a warning means 3 provided to warn a driver of the possibility of a collision between an obstacle and the driver's vehicle, and a control means 4 for determining whether the turn signal lamp is turned on and automatically driving the warning means 3 when an obstacle is detected in a blind spot present on the side on which the turn signal lamp is turned on.

The conventional blind spot detection system having the above construction is configured such that the infrared sensor means 2, corresponding to a target direction, is operated (S102) by turning on a turn signal lamp (S101), the presence of an obstacle in a blind spot is determined (S103) by the control means 4, and the obstacle is recognized (S104), and such that information about the results of recognition are provided (S105) to the driver through the warning means 3 in the form of a visual and audible warning.

However, in the above operation mechanism, when the driver does not turn on a turn signal lamp, the warning means 3 is not operated even if the driver changes lanes, and does not provide a warning even when a warning must be provided for side impacts.

Therefore, even if an obstacle is detected in a blind spot, which cannot be sensed by a driver at the time of changing lanes, there is no method of informing the driver of the presence of the obstacle, so that the accident prevention function is deteriorated, and the original purpose of the blind spot detection system itself, to decrease the danger of accidents, is defeated.

SUMMARY OF THE INVENTION

Accordingly, the present invention has been made keeping in mind the above problems occurring in the prior art, and an object of the present invention is to provide a collision avoidance system based on the detection of obstacles in the blind spots of a vehicle, which detects an obstacle present in a blind spot even if a driver does not turn on a turn signal lamp at the time of changing lanes, thus informing the driver of the presence of the obstacle.

Another object of the present invention is to provide a collision avoidance system based on the detection of obstacles in the blind spots of a vehicle, which eliminates the influence of external noise using a high-efficiency infrared sensor, and also detects the environment of a road for a long distance, thus providing information about the road environment to the driver.

A further object of the present invention is to provide a collision avoidance system based on the detection of obstacles in the blind spots of a vehicle, in which infrared emission units are integrated into a single emission unit in a vehicle blind spot detection system using an infrared LED, thus enabling a system to be configured to have a small size, and in which the infrared characteristics of the detection system are unified into a single characteristic component, thus improving the detection performance of a reception unit.

In order to accomplish the above objects, the present invention provides a collision avoidance system based on detection of obstacles in blind spots of a vehicle, comprising turn signal lamp detection means for detecting whether a turn signal lamp of the vehicle is turned on; Charged Coupled Device (CCD) camera means for capturing an image for a road environment, and outputting the captured image as road environment data, thus determining whether a current road environment indicates a winding road; steering angle detection means for detecting a steering angle of the vehicle and outputting a resulting signal as a steering angle signal; infrared sensor means for transmitting or receiving infrared light to or from an obstacle present in a blind spot of the vehicle according to the steering angle signal, output from the steering angle detection means, and outputting an obstacle detection signal; warning means configured to provide a warning of possibility of a collision between the obstacle and the vehicle to a driver; and control means for automatically driving the warning means when the obstacle detection signal for the blind spot is received from the infrared sensor means in a case where a turn signal lamp is determined to be turned on by the turn signal lamp detection means, or where a lane change is determined to be performed by receiving the road environment data from the CCD camera means and the steering angle signal measured by the steering angle detection means.

Preferably, the CCD camera means may comprise a light receiving unit for receiving an image of the obstacle; an image sensor for receiving an obstacle image signal through the light receiving unit, and operating to generate an analog image signal for the obstacle; an Analog/Digital (A/D) converter for converting the analog image signal from the image sensor into a digital image signal; and a central processing unit for receiving the digital image signal from the A/D converter and transmitting the digital image signal to the control means.

Preferably, the infrared sensor means may comprise a single-channel infrared emission unit provided with a single infrared Light Emitting Diode (LED) and configured to emit infrared light; an optical path change unit provided with a reflective plate that is installed on a light output portion of the single-channel infrared emission unit, and that is configured to allow the infrared light emitted from the infrared LED to travel to the blind spot of the vehicle; a rotating reflective unit installed parallel to the optical path change unit so that the rotating reflective unit is placed to form a right angle or an obtuse angle with the reflective plate of the optical path change unit, thus rotating while continuously reflecting reflected infrared light toward the blind spot of the vehicle and scattering the infrared light over the blind spot; and a reception control unit for detecting incident infrared light and performing a control operation to determine presence of an obstacle.

Preferably, the infrared emission unit may emit a Pulse Width Modulation (PWM)-controlled signal, in which a driving frequency of the infrared LED is modulated to a carrier frequency.

Preferably, the reflective plate may be operated to receive the infrared light emitted from the infrared LED of the single-channel infrared emission unit at an input angle of 45°, and to allow the infrared light to travel to the rotating reflective prism at an angle of 45°.

Preferably, the rotating reflector unit may comprise a deceleration motor for rotating a shaft using externally supplied power; and a rotating reflective prism for reflecting the infrared light, emitted from the infrared LED, at a different angle while being coupled to the shaft and being rotated.

Preferably, the infrared sensor means may further comprise a driving power control unit for controlling the infrared LED such that infrared light is emitted within a range of the blind spot of the vehicle according to a number of rotations per minute of the rotating reflective prism and a reflection angle of infrared light reflected by the rotating reflective prism.

Preferably, the driving power control unit may control emission of infrared light by repeatedly supplying power to the infrared LED in a frequency modulation manner.

Preferably, the infrared sensor means may be formed to have a small size and may be placed below a side rear view mirror so as to maintain a size of an existing side rear view mirror.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
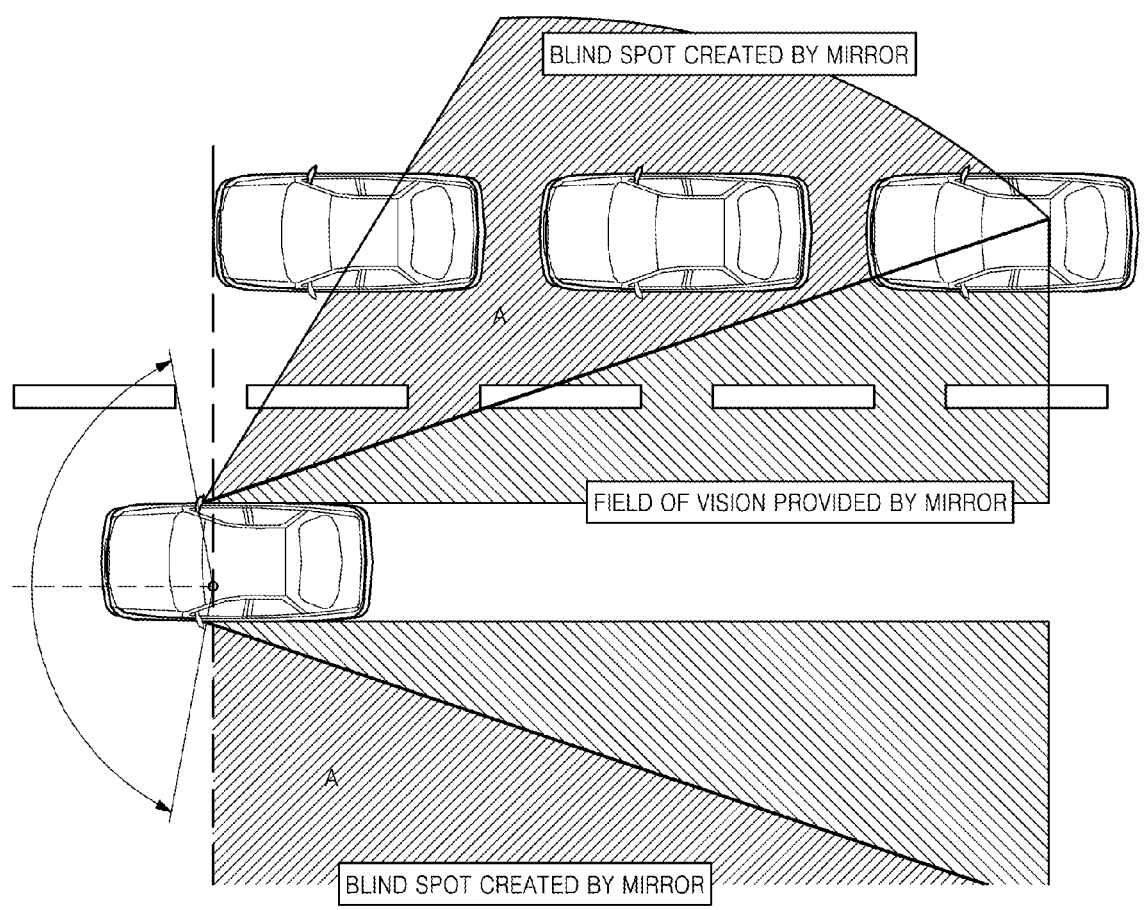
FIG. 1 is a diagram showing a region that can be checked by a driver using a conventional side rear view mirror, and a blind spot region occurring due to the visual restriction of a side rear view mirror or a driver.
Figure 2:
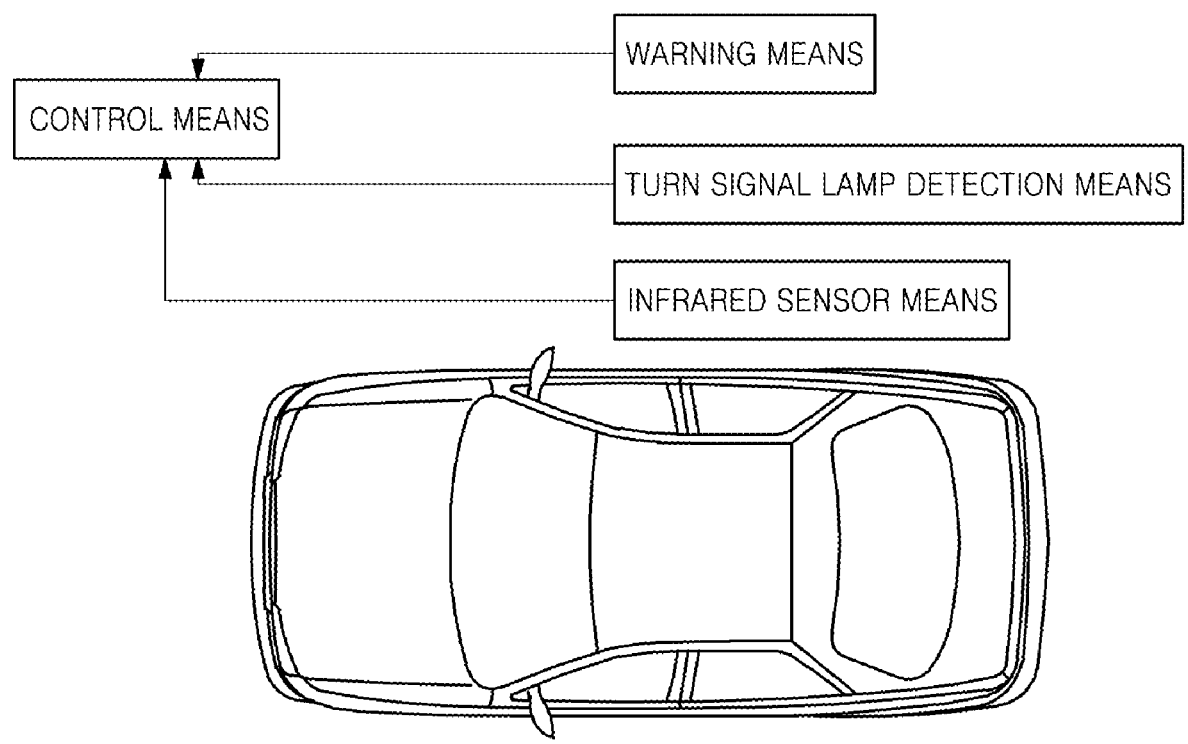
FIG. 2 is a diagram showing the construction of a conventional vehicle blind spot detection system.
Figure 3:
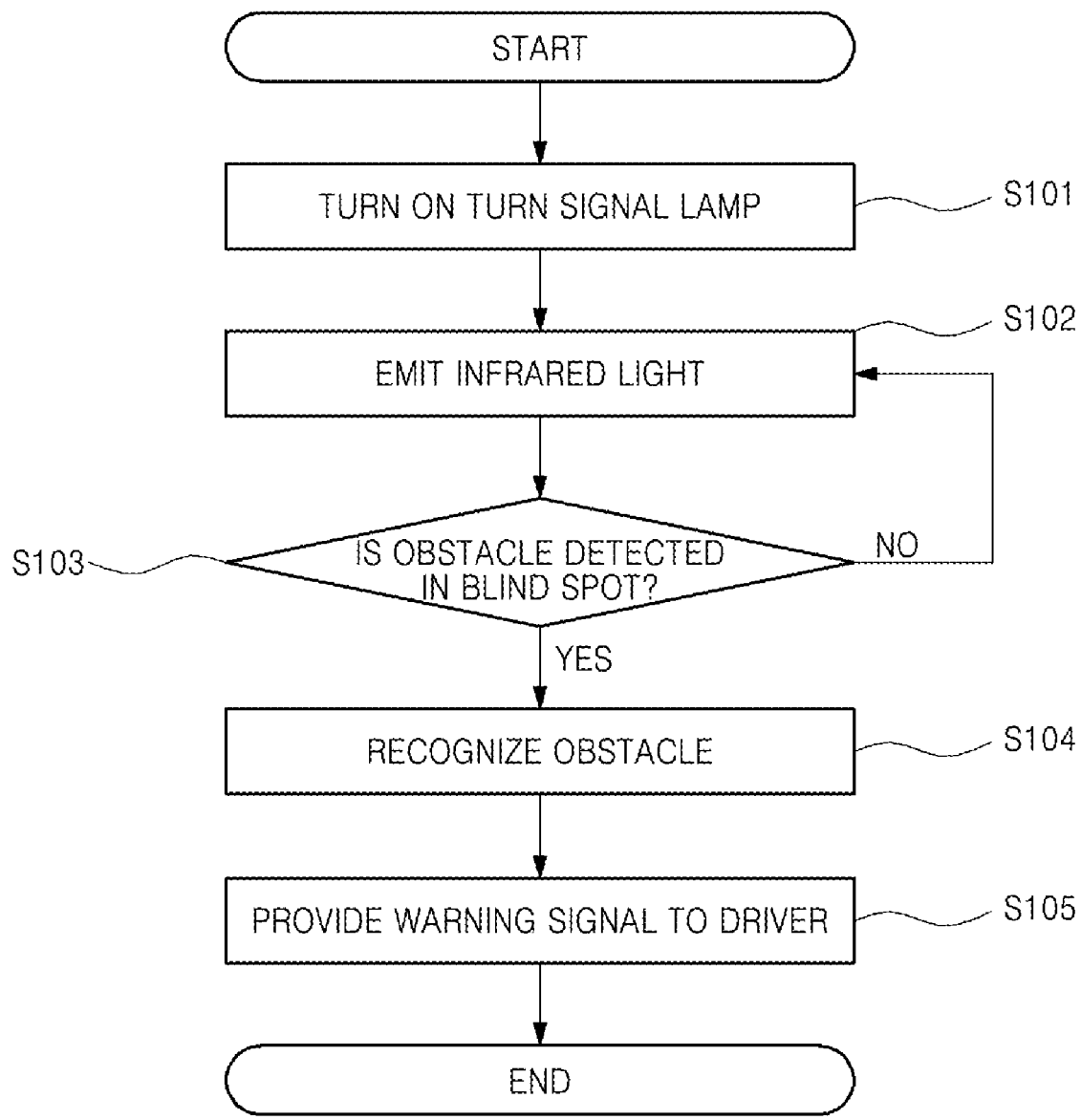
FIG. 3 is a flowchart showing a process for detecting an obstacle in a blind spot using the conventional blind spot detection system.

Hereinafter, embodiments of the present invention will be described in detail with reference to the attached drawings. The following embodiments can be modified into various other forms. The scope of the present invention is not limited to the following embodiments. The embodiments of the present invention are provided to more clearly describe the present invention to those skilled in the art. Reference now should be made to the drawings, in which the same reference numerals are used throughout the different drawings to designate the same or similar components.

Figure 4:
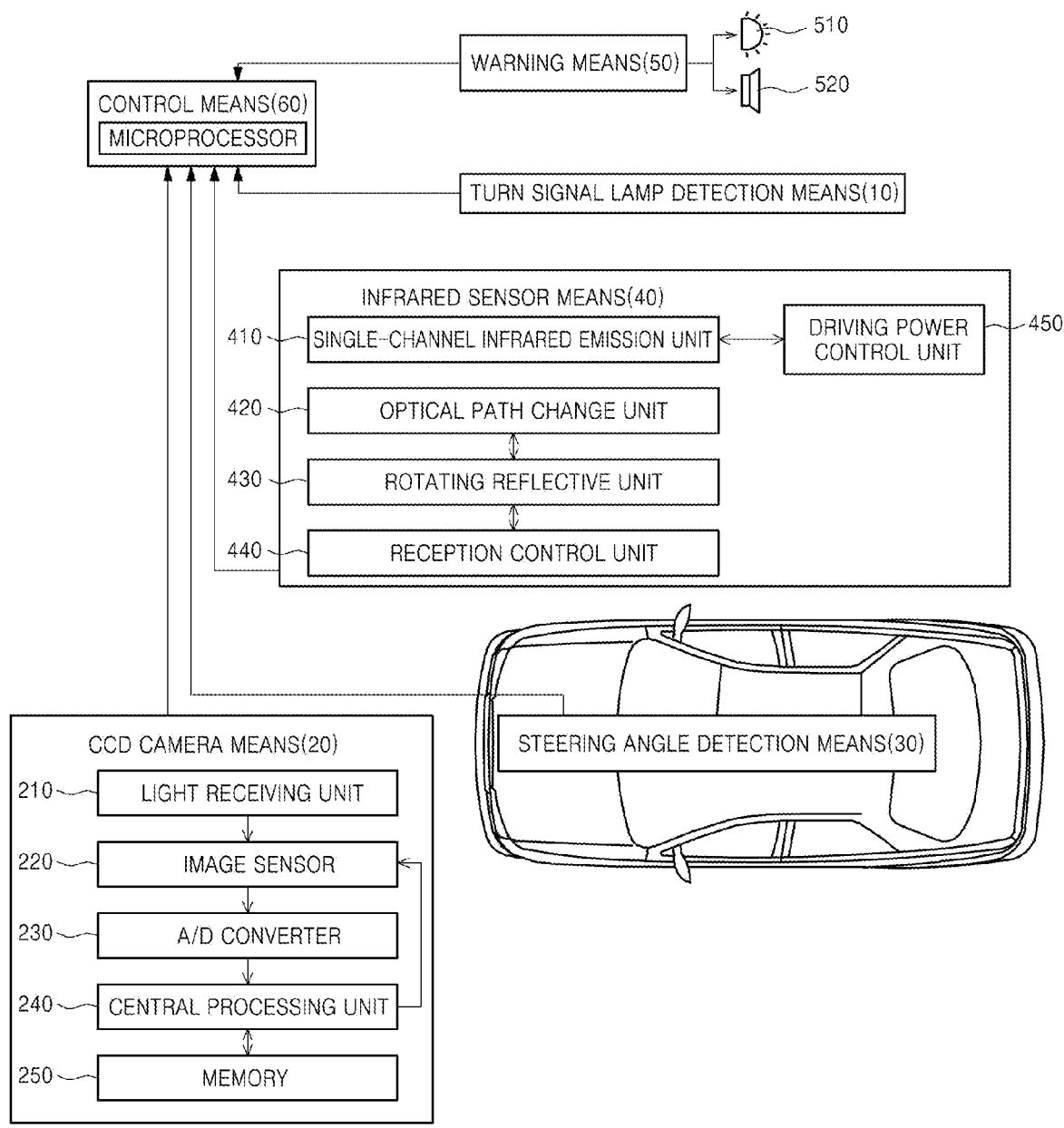
FIG. 4 is a diagram showing the construction of a collision avoidance system based on the detection of obstacles in the blind spots of a vehicle according to the present invention.

FIG. 4 is a diagram showing the construction of a collision avoidance system based on the detection of obstacles in the blind spots of a vehicle according to an embodiment of the present invention.

Referring to FIG. 4, the collision avoidance system based on the detection of obstacles in the blind spots of a vehicle according to an embodiment of the present invention includes a turn signal lamp detection means 10, a Charge Coupled Device (CCD) camera means 20, a steering angle detection means 30, an infrared sensor means 40, a warning means 50, and a control means 60.

First, the turn signal lamp detection means 10 according to the present invention is described.

The turn signal lamp detection means 10, which is configured to determine whether the turn signal lamp of a vehicle is currently turned on, detects voltage applied to the turn signal lamp. When the turn signal lamp is on, a voltage drop occurs due to the power consumption of the turn signal lamp, and thus a difference appears with respect to rated voltage. Accordingly, the turn signal lamp detection means 10 can reliably detect the ON state of the turn signal lamp.

Next, the CCD camera means 20 of the present invention is described.

In the CCD camera means 20, an image of a road environment input through a light receiving unit 210, such as a lens, is acquired by an image sensor 220. The image sensor 220 is a device capable of electrically acquiring an image, and may include a Charge Coupled Device (CCD) or a Charge Injection Device (CID). The output of the image sensor 220 is converted into digital data in real time by an Analog/Digital (A/D) converter 230. The image information, converted into the digital data by the A/D converter 230, is temporarily stored in memory 250 by a central processing unit 240. The image information stored in the memory 250 is transmitted to a control means 60, which will be described later, so that the image is output, or alternatively, information required for traveling is extracted from the image. That is, the control means 60 primarily extracts information about the slope of a road and the type or color of lane from the road, and eliminates the influence of variation in illuminance and noise from the extracted information. Thereafter, the control means 60 secondarily classifies such information, thus completing the detection of road environment data, which together describes roads, obstacles, etc.

Next, the steering angle detection means 30 of the present invention is described.

The steering angle detection means 30 can be variously constructed. Of various constructions, a steering sensor and a gyro sensor, which are well known, are described as examples in the present invention.

A steering sensor includes a slit disk installed on the steering shaft of a vehicle to rotate, and a photo interrupt sensor composed of a Light Emitting Diode (LED) and a photo-transistor and installed on a steering column, the outer circumference of the slit disk being disposed between the LED and the photo-transistor. Therefore, when the steering shaft rotates, the photo interrupt sensor is operated to generate ON/OFF pulse waves whenever the steering angle varies at a certain angle according to the transmission or interruption of light generated by the LED through the slit disc, and to count the ON/OFF pulse waves, thus checking the steering angle. Further, a gyro sensor, which applies the Coriolis principle, is implemented using, for example, an equilateral triangular prism, which is a vibrator. On one side of the prism, a piezoelectric ceramic device for feeding back a detected voltage is disposed, and, on the remaining sides thereof, piezoelectric ceramic devices, which are detectors, are disposed. When AC voltage is applied to the vibrator, the vibrator vibrates at a predetermined frequency. In this state, when the vehicle turns at a predetermined angular velocity, the piezoelectric ceramic detectors output AC voltage while inclining in a direction perpendicular to an excitation direction due to Coriolis force. An excitation wave having an AC waveform generated by the detectors is synchronously detected, so that the direction and intensity of rotation can be reliably detected. Since such a gyro sensor can be simply installed at any location in a vehicle, there is an advantage in that the gyro sensor can be installed in a vehicle not equipped with a steering sensor to be able to easily measure the steering angle.

Next, the infrared sensor means (IR-detector) 40 of the present invention is described.

The infrared sensor means 40 includes a single-channel infrared emission unit 410, an optical path change unit 420, a rotating reflective unit 430, and a reception control unit 440.

Figure 5:
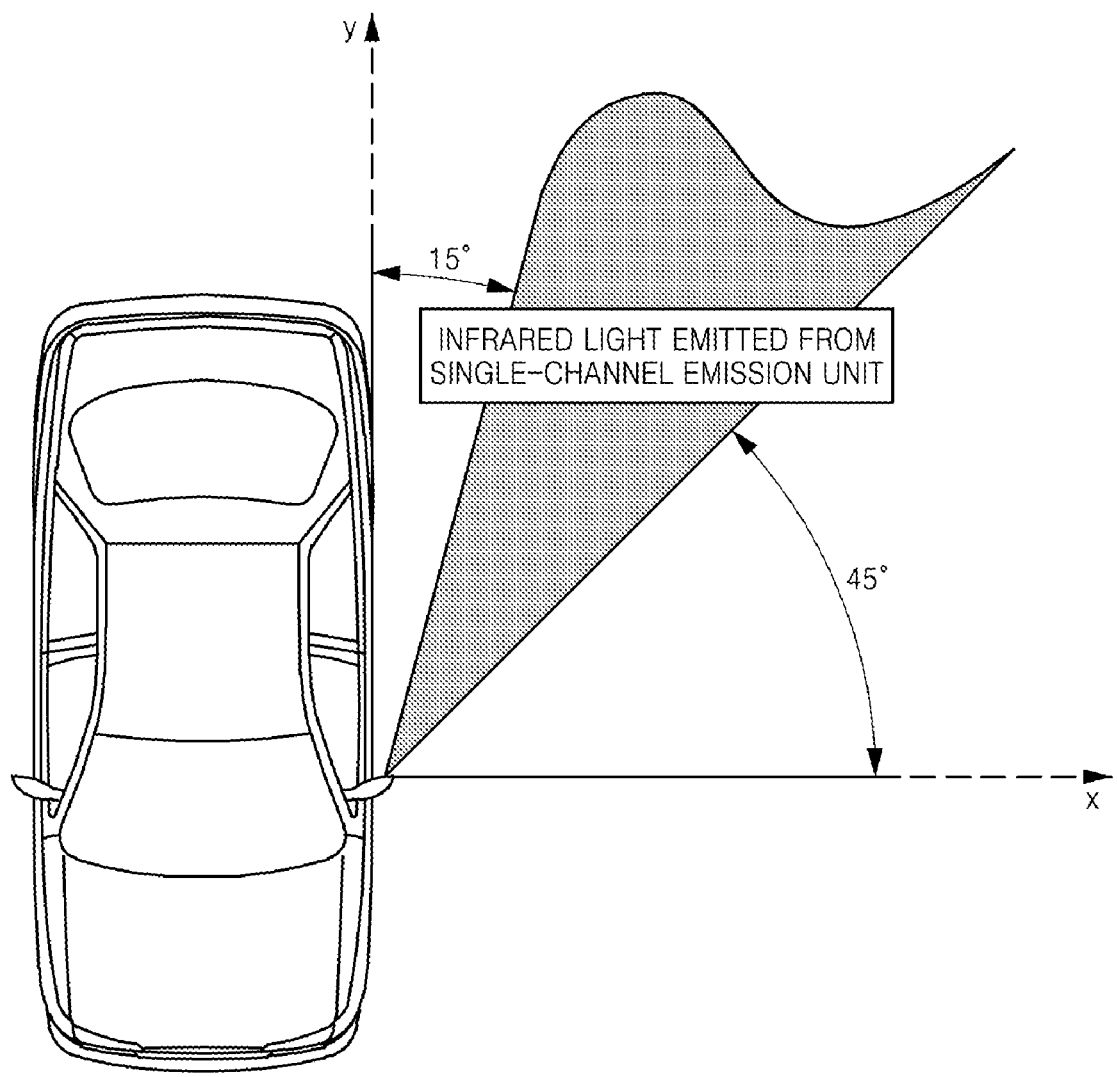
FIG. 5 is a diagram showing the emission of infrared light performed by a single channel emission unit for infrared LEDs according to the present invention.

FIG. 5 is a schematic diagram showing the scattering of infrared light by the single-channel infrared emission unit 410 of the present invention over the blind spot region of a vehicle.

Referring to FIG. 5, the single-channel infrared emission unit 410 has a single infrared LED 412 and is installed at a portion in the interior of a vehicle. This is implemented by replacing conventional multiple channel infrared emission units with a single channel, and is advantageous in that, since the single-channel infrared emission unit 410 is used, the total volume of the system can be minimized, and in that, since infrared light is driven by a single carrier frequency and a single driving frequency, performance can be improved. Further, in order to eliminate the influence of external noise having a wavelength region similar to that of the infrared light that is used, such as vehicle headlights or sunbeams, the infrared LED 412 prevents erroneous operation attributable to sunbeams or vehicle headlights by outputting infrared light using a Pulse-Width Modulation (PWM) controlled signal, in which a driving frequency is modulated to a carrier frequency.

The optical path change unit 420 is required to reflect infrared light, emitted from the infrared LED 412 of the single-channel infrared emission unit 410, installed at a portion in the interior of the vehicle, toward the blind spot region of the vehicle, and is provided with a reflective plate 422 on the light output portion of the single-channel infrared emission unit 410. The reflective plate 422 is placed on a line perpendicular to the infrared LED 412 and is configured to reflect incident infrared light, incident at an angle of 90°, and to cause the reflected infrared light to travel. That is, the reflective plate 422 receives infrared light emitted from the infrared LED 412 at an angle of 45° and causes the infrared light to travel at a reflection angle of 45° toward the rotating reflective prism 432.

The rotating reflective unit 430 is configured to continuously reflect the infrared light, reflected from the optical path change unit 420, toward the blind spot region of the vehicle using the rotating reflective prism 432 and to scatter the infrared light, and is composed of a rotating prism 432, a deceleration motor 434, and a shaft 436.

The rotating reflective prism 432 is installed parallel to the optical path change unit 420 so that it forms a right angle or an obtuse angle with the reflective plate 422 of the optical path change unit 420, and is configured to primarily reflect infrared light toward the blind spot region while rotating within a range of angles from 90° to 135°. In this case, the rotating reflective prism 432 is configured to use an isosceles right angle prism.

The rotating reflective prism 432 is coupled to the small-sized deceleration motor 434 through the shaft 436 by externally supplied power, such as that of a battery or the like, at the time of starting the vehicle, and is configured to change the reflection angle through the rotation of the deceleration motor 434. In this case, the number of rotations of the deceleration motor 434 is 20 to 180 rpm.

When the infrared light emitted in this way collides with an obstacle and is reflected therefrom, the reflected light is received by the reception control unit 440. The reception control unit 440 determines whether an obstacle is present depending on whether a predetermined amount of infrared light is reflected from the obstacle.

Figure 6:
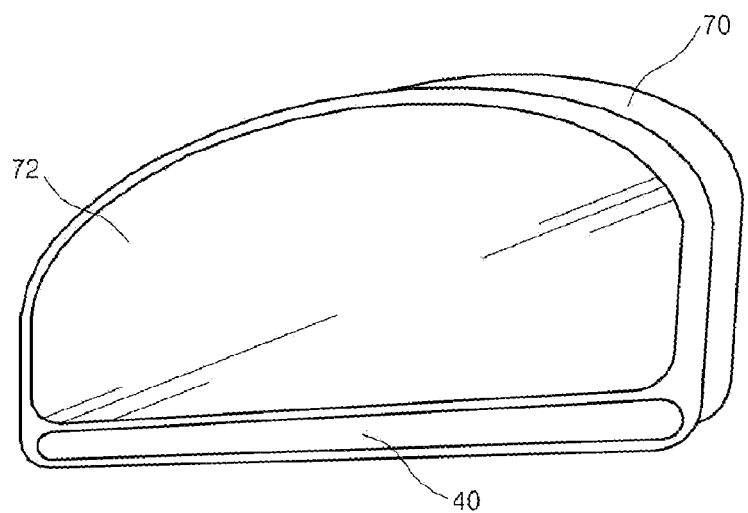
FIG. 6 is a diagram showing the location of an infrared sensor means mounted on a side rear view mirror according to the present invention.

FIG. 6 is a diagram showing the position of the infrared sensor means 40 installed on a side rear view mirror according to the present invention.

As shown in FIG. 6, the lower portion of a side rear view mirror housing 70 is slightly widened and the infrared sensor means 40 is inserted into the widened portion. When the size of a mirror 72, installed in an existing side rear view mirror housing 70, changes, it is difficult to secure an angle of view, and thus the size of the existing mirror 72 is unchanged, and the size of the side rear view mirror housing 70 is increased.

Figure 7:
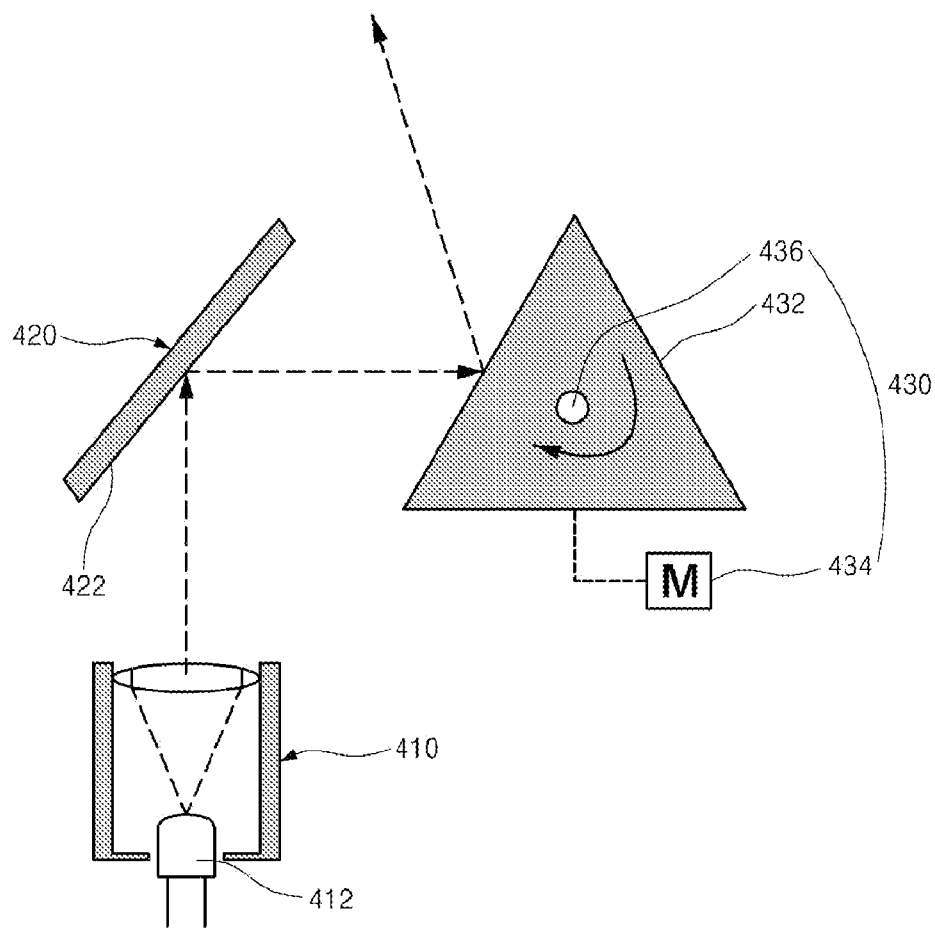
FIG. 7 is a diagram showing the position of a rotating reflective prism and the emission path of infrared light at the time at which infrared light is emitted from a single-channel infrared emission unit according to the present invention.
Figure 8:
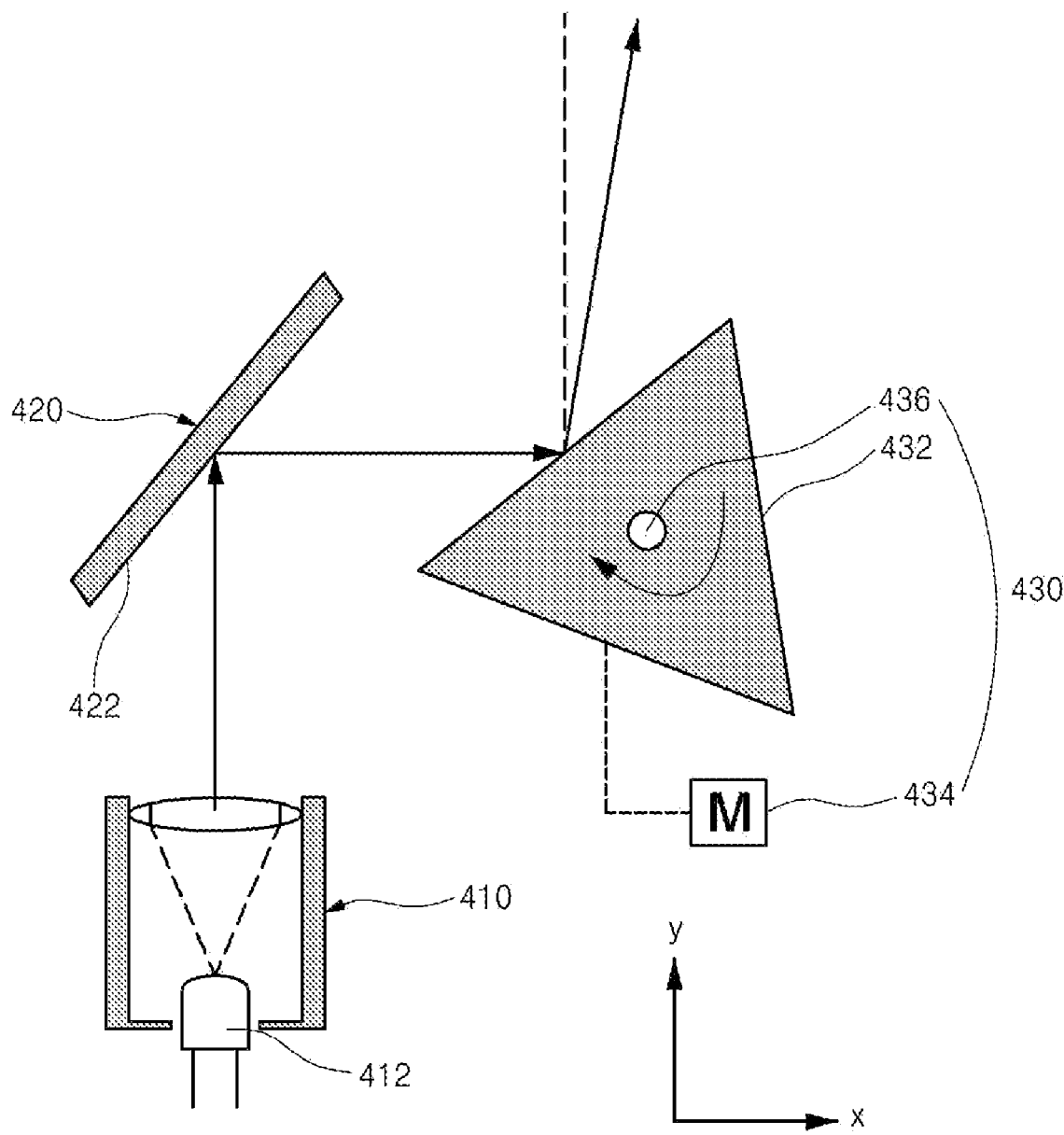
FIG. 8 is a diagram showing the position of a rotating reflective prism and the emission path of infrared light at the time at which the emission of infrared light from the single-channel infrared emission unit is terminated according to the present invention.

FIG. 7 is a schematic diagram showing the position of the rotating reflective prism and the emission path of infrared light at the time at which infrared light is emitted from the single-channel infrared emission unit according to the present invention, and FIG. 8 is a schematic diagram showing the position of the rotating reflective prism and the emission path of infrared light at the time at which the emission of infrared light from the single-channel infrared emission unit is terminated according to the present invention.

As shown in FIGS. 7 and 8, the emission of infrared light from the single-channel infrared emission unit 410 is initiated when the reflection angle of infrared light by the rotating reflective prism 432 is 15° with respect to the side of a vehicle body, which is the blind spot region of the vehicle, and is terminated when the reflection angle is 45°. The emission of the subsequent infrared light is performed when the rotating reflective prism 432 rotates and the reflection angle of infrared light becomes 15° with respect to the side of the vehicle body.

Meanwhile, according to another embodiment of the present invention, the infrared sensor means 40 preferably further includes a driving power control unit 450 for controlling the emission of infrared light required to transmit the infrared light from the infrared LED 412 at the angle of the blind spot region of the vehicle according to the number of rotations per minute of the rotating reflective prism 432.

Figure 9:
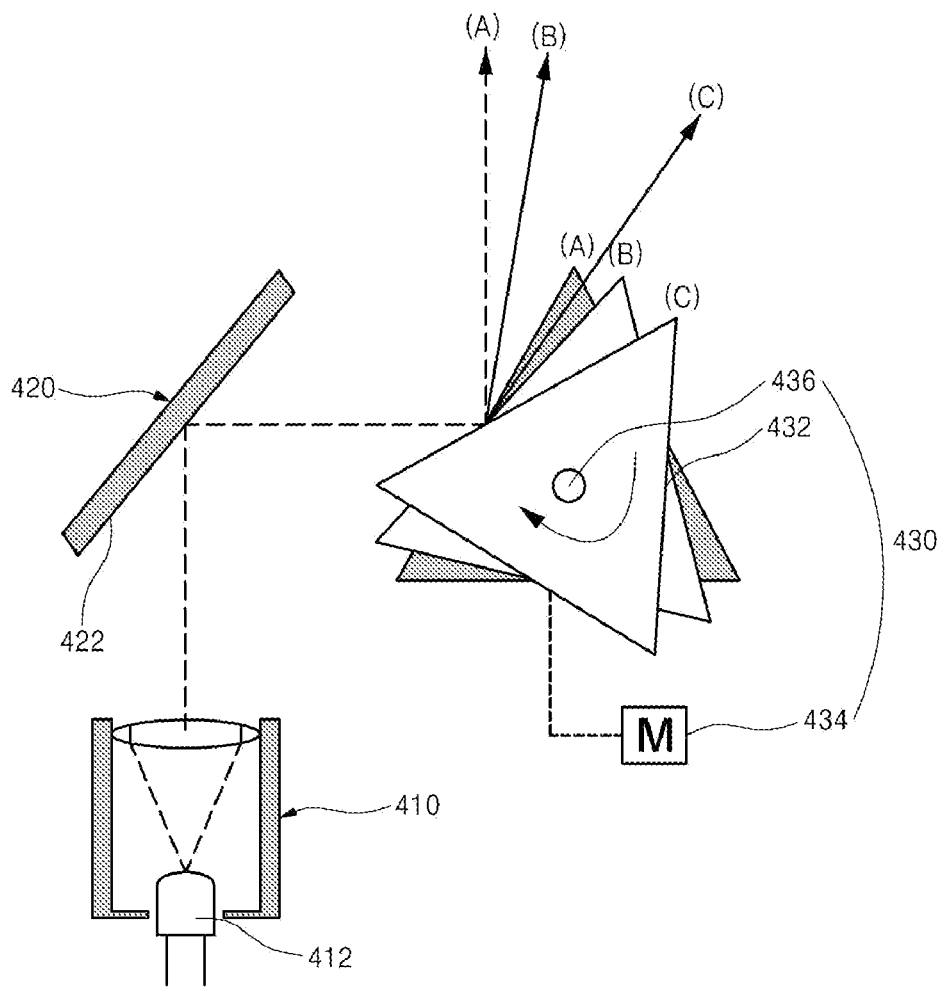
FIG. 9 is a diagram showing the control of the supply of power to an infrared LED performed by a driving power control unit according to the present invention.
Figure 9:
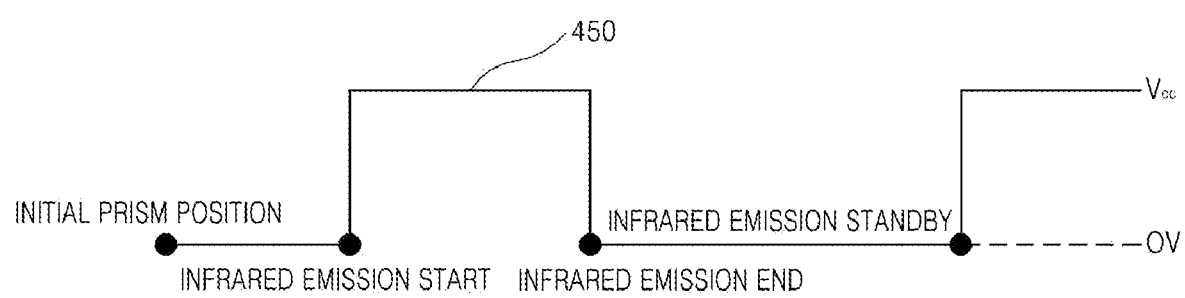

FIG. 9 is a diagram showing the control of the supply of power to the infrared LED performed by the driving power control unit 450 in order to emit infrared light into the range of the blind spot of a vehicle corresponding to the path of reflection of infrared light by the rotating reflective prism and the rotation speed of the rotating reflective prism according to the present invention.

As shown in FIG. 9, the driving power control unit 450 of the present invention controls the ON and OFF operation of the infrared LED 412 by regulating the supply of power required to drive the infrared LED 412 through Pulse Width Modulation (PWM) according to the path of reflection of infrared light by the rotating reflective prism 432, that is, the reflection angle of the infrared light and the rotation speed or the number of rotations of the rotating reflective prism 432, in order to emit the infrared light of the infrared LED 412 into the range of the blind spot of the vehicle.

That is, in the present invention, in order to cause infrared light reflected by the rotating reflective prism 432 to be emitted to a region that forms an angle of 15° with respect to the side of the vehicle body, the rotating reflective prism 432 must rotate at an angle of 22.5° from its initial position (A). The single-channel infrared emission unit 410 starts to emit infrared light (B) when the rotating reflective prism 432 rotates at an angle of 22.5°. Further, in order to cause the infrared light, reflected by the rotating reflective prism 432, to be reflected at an angle of 45° with respect to the side of the vehicle body, the rotating reflective prism 432 must rotate at an angle of 15° in the same direction (C) after initial rotation. At this time, the single-channel infrared emission unit 410 stops emitting infrared light, and resumes emitting infrared light at the subsequent emission time, that is, when the rotating reflective prism 432 rotates at an angle of 105° in the same direction, and the angle of reflection of infrared light becomes 15° with respect to the side of the vehicle body.

In this case, when it is assumed that n is a predetermined natural number, and the number of rotations per minute of the rotating reflective prism 432 is n, the driving power control unit 450 calculates the time taken for the rotating reflective prism 432 to rotate once, and thus calculates the time (B) taken for the rotating reflective prism 432 to initially rotate at an angle of 22.5°, the time (C) taken for the prism 432 to secondarily rotate at an angle of 15° while infrared light is emitted, and the time (D) taken for the prism 432 to rotate at an angle of 105° until the emission of infrared light is resumed.

In this way, the infrared sensor means 40 functions to identify an obstacle existing a short distance from the vehicle, for example, a fire hydrant, and also to indicate the presence of a vehicle approaching in an opposite direction on a two-lane roadway.

Next, the warning means 50 of the present invention is described.

In the warning means 50, a warning lamp 510, turned on in response to a warning signal, or a speaker 520, configured to output a warning as a warning sound, is mounted. The location at which the warning lamp 510 is mounted may be at least one of the inner surfaces of left/right side rear view mirrors facing the vehicle and one end of a rear view mirror. In particular, an approaching vehicle warning, appearing in a small icon installed on a rear mirror, is advantageous in that a driver can easily monitor vehicles located at a long distance or in a blind spot while focusing the driver's eyes on the mirror. In addition to visual warning, a warning sound may be output, or a warning indication may be displayed on a dashboard according to the preference of a vehicle production company.

Next, the control means 60 of the present invention is described.

The control means 60 receives signals from the turn signal lamp detection means 10, the CCD camera means 20 and the steering angle detection means 30, and inputs the signals to a microprocessor 610. On the basis of the signals, the microprocessor 610 initiates the driving of the infrared sensor means 40 only when a turn signal lamp is turned on, or when it is determined that a lane change is performed by comparing the road environment data of the CCD camera means 20 with the steering angle signal of the steering angle detection means 30. The control means 60 determines whether another vehicle or an obstacle is present in the blind spot through the driven infrared sensor means 40. When another vehicle or obstacle is present in the blind spot, the control means 60 transmits a detection signal to the warning means 60, thus enabling a warning to be output.

Figure 10:
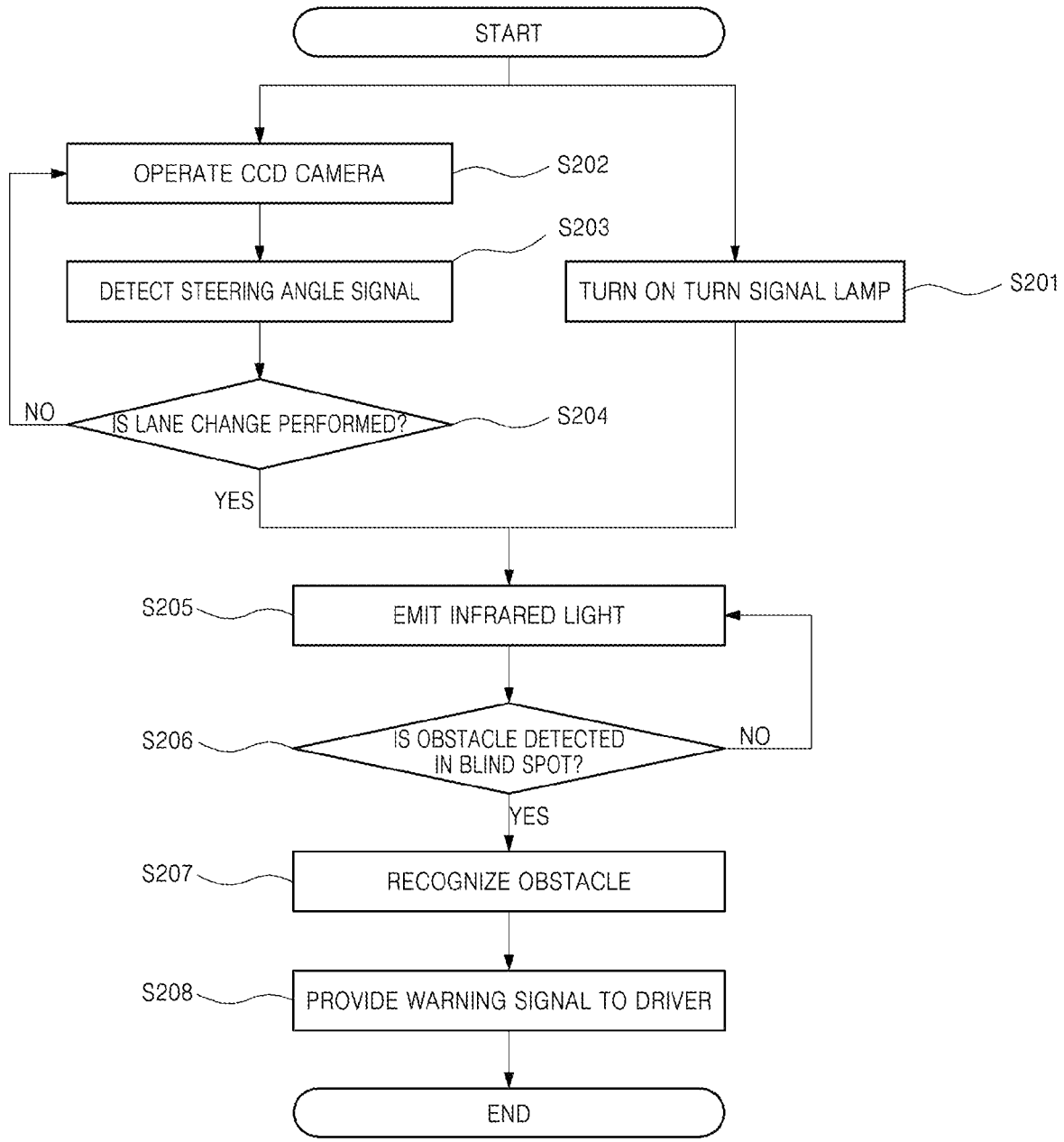
FIG. 10 is a flowchart showing a process for detecting an obstacle in a blind spot using the collision avoidance system based on the detection of obstacles in the blind spots of a vehicle according to the present invention.

FIG. 10 is a flowchart showing a process for detecting an obstacle in a blind spot using the collision avoidance system based on the detection of obstacles in the blind spots of a vehicle according to an embodiment of the present invention, and the operating process thereof is described in detail.

In the present invention, the infrared sensor means 40 starts to operate after the turn signal lamp is turned on at step S201, or after it is determined that a lane change is performed at step S204 through the comparison between the operation of the CCD camera at step S202 and the detection of a steering angle signal at step S203.

First, when the turn signal lamp is turned on at step S201, the infrared sensor means 40, provided to have a transmission range for the blind spot of a vehicle, transmits an infrared signal to the blind spot of the vehicle at step S205, receives an infrared signal reflected from the obstacle, and transmits the received signal to the control means 60. The control means 60, having received the signal, determines whether an obstacle is detected by receiving the signal from the infrared sensor means 40 at step S206. If it is determined that no obstacle is detected, the infrared sensor means 40 transmits and receives infrared signals, thus repeating the above process, whereas, if it is determined that an obstacle is detected, the control means recognizes the obstacle at step S207, and turns on the warning lamp 510 of the warning means 50 or outputs a warning sound through the speaker 520, thus warning the driver of the presence of the obstacle in the blind spot at step S208. In this case, when the obstacle is detected, the control means 60 may turn on the warning lamp 510, or may operate the speaker 520 and output a warning sound by operating the warning means 50, or may simultaneously perform both actions, according to the previous selection by the driver. Such selection may be performed such that a separate selection switch (not shown) is provided to allow the driver to manipulate the switch. Alternatively, a warning signal is automatically displayed, and a warning of the presence of an obstacle can be audibly provided.

Meanwhile, the case where a lane change is performed without turning on a turn signal lamp is described.

Whether an obstacle is detected in the blind spot is continuously determined using the CCD camera means 20 when the ON state of the turn signal lamp is not detected by the turn signal lamp detection means 10 at step S202. Further, the steering angle signal is detected by the steering angle detection means 30 at step S203. When the steering angle is greater than or less than a preprogrammed steering angle, occurring during traveling on a typical winding road, a lane change is determined to be performed at step S204. The infrared sensor means 40 emits infrared light at step S205, and the control unit 60 determines whether an obstacle is detected in the blind spot at step S206. When an obstacle is detected in the blind spot at step S207, the control means 60 visually or audibly transmits the possibility of a collision with the obstacle to the driver using the warning lamp 510 or the speaker 520 through the warning means 50 at step S208.

Meanwhile, the detected steering angle signal is checked at step S203. If the steering angle is almost the same as the preprogrammed steering angle, occurring during traveling on a typical winding road, it is determined that a lane change is not performed, and the steering angle detection means 30 continues to check a steering angle at step S204. This is performed to prevent an excessive warning provided by the warning means 50 by excluding a steering angle that is detected for a short period of time, or a steering angle that is below several degrees (°), that is, a steering angle occurring during typical travel.

In this way, the present invention is a useful invention, the operation mechanism of which is improved so as to operate the warning means 50 in such a way that, even if a driver does not turn on a turn signal lamp at the time of changing lanes, the control means 60 determines whether a lane change is performed through the comparison between the CCD camera means 20 and the steering angle detection means 30.

Accordingly, the present invention, having the above construction, enables the operation of a blind spot detection device even if a turn signal lamp is not turned on, so that a warning of the presence of a vehicle in a blind spot is provided to a driver, thus preventing accidents from occurring during a process of changing lanes, and thus greatly contributing to the elimination of difficulty in changing lanes by a large number of inexperienced drivers.

Further, the present invention is advantageous in that, since a single-channel emission unit and a rotating reflective prism are used, and the emission time of infrared light is controlled in consideration of the rotation speed of a prism, the incidence angle of infrared light, the reflection angle of infrared light by the prism, etc, infrared light can be scattered over a blind spot region.

Furthermore, the present invention is advantageous in that, since infrared LED emission units are replaced with a single-channel emission unit, the entire system is realized to have a small size, so that the system can be easily mounted on the side rear view mirror, and in that, since a unified carrier frequency and a driving frequency are used as the infrared characteristics of the system, the detection performance of a reception unit can be improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A collision avoidance system based on detection of obstacles in blind spots of a vehicle, comprising:
    a turn signal lamp detector for detecting an activation of a turn signal lamp of the vehicle;
    a charge-coupled device (CCD) camera for capturing an image for a road environment, outputting the captured image as road environment data, and measuring a winding or curvature degree of a current road;
    a steering angle detector for detecting a steering angle of the vehicle and outputting a resulting signal as a steering angle signal;
    an infrared sensor for transmitting or receiving infrared light to or from an obstacle present in a blind spot of the vehicle, and outputting an obstacle detection signal;
    a warning device configured to warn a possibility of collision between the obstacle and the vehicle to a driver; and
    a controller configured to operate the warning device upon detection of the activation of the turn signal lamp by the turn signal lamp detector, followed by activation of the infrared sensor to determine presence of an obstacle in the blind spot, the controller further configured to operate the warning device upon detection of a progress of lane change based on comparison between the road environment data and the steering angle signal output, followed by activation of the infrared sensor to determine presence of an obstacle in the blind spot.

2. The collision avoidance system according to claim 1, wherein the CCD camera comprises:
    a light receiving unit for receiving an image of the obstacle;
    an image sensor for receiving an obstacle image signal through the light receiving unit, and operating to generate an analog image signal for the obstacle;
    an Analog/Digital (A/D) converter for converting the analog image signal from the image sensor into a digital image signal; and
    a central processing unit for receiving the digital image signal from the A/D converter and transmitting the digital image signal to the controller.

3. The collision avoidance system according to claim 1, wherein the infrared sensor comprises:
    a single-channel infrared emission unit provided with a single infrared Light Emitting Diode (LED) and configured to emit infrared light;
    an optical path change unit provided with a reflective plate that is installed on a light output portion of the single-channel infrared emission unit, and that is configured to allow the infrared light emitted from the infrared LED to travel to the blind spot of the vehicle;
    a rotating reflective unit installed relative to the optical path change unit so that the rotating reflective unit is placed to form a predetermined angle with the reflective plate of the optical path change unit, and rotating while continuously reflecting the reflected infrared light toward the blind spot of the vehicle and scattering the infrared light over the blind spot; and
    a reception control unit for detecting incident infrared light and performing a control operation to determine presence of an obstacle.

4. The collision avoidance system according to claim 3, wherein the infrared emission unit emits a Pulse Width Modulation (PWM)-controlled signal, in which a driving frequency of the infrared LED is modulated to a carrier frequency.

5. The collision avoidance system according to claim 3, wherein the reflective plate is operated to receive the infrared light emitted from the infrared LED of the single-channel infrared emission unit at an input angle of 45°, and to allow the infrared light to travel to the rotating reflective unit at an angle of 45°.

6. The collision avoidance system according to claim 3, wherein the rotating reflector unit comprises:
    a deceleration motor for rotating a shaft using externally supplied power; and
    a rotating reflective prism for reflecting the infrared light, emitted from the infrared LED, at a different angle while being coupled to the shaft and being rotated.

7. The collision avoidance system according to claim 3, wherein the infrared sensor further comprises a driving power control unit for controlling the infrared LED such that infrared light is emitted within a range of the blind spot of the vehicle according to a number of rotations per minute of the rotating reflective prism and a reflection angle of infrared light reflected by the rotating reflective prism.

8. The collision avoidance system according to claim 7, wherein the driving power control unit controls emission of infrared light by repeatedly supplying power to the infrared LED in a frequency modulation manner.

9. The collision avoidance system according to claim 7, wherein the infrared sensor is placed below a mirror provided on a side rear view mirror housing.

10. The collision avoidance system according to claim 1, wherein the warning device is a warning lamp or a speaker configured to be activated to warn the driver the possibility of collision with the obstacle.

11. The collision avoidance system according to claim 1, wherein the warning device is a combination of a warning lamp and a speaker each configured to be activated to warn the driver the possibility of collision with the obstacle.

* * * * *